United States Patent
Yamashita et al.

(10) Patent No.: US 6,640,564 B2
(45) Date of Patent: Nov. 4, 2003

(54) VEHICLE AIR CONDITIONER WITH AUTOMATIC BREAKING-IN OPERATION OF COMPRESSOR

(75) Inventors: Koji Yamashita, Kariya (JP); Mitsuyo Oomura, Kariya (JP); Satohisa Yoshida, Kariya (JP); Makoto Umebayashi, Kariya (JP)

(73) Assignee: Denso Corporation, Kariya (JP)

( * ) Notice: Subject to any disclaimer, the term of this patent is extended or adjusted under 35 U.S.C. 154(b) by 7 days.

(21) Appl. No.: 10/131,279

(22) Filed: Apr. 24, 2002

(65) Prior Publication Data

US 2003/0106331 A1 Jun. 12, 2003

(30) Foreign Application Priority Data

Apr. 26, 2001 (JP) .......................................... 2001-130127

(51) Int. Cl.[7] ............... F25B 1/00; B60H 1/32
(52) U.S. Cl. .............. 62/133; 62/228.3; 123/1 R; 417/12; 417/63
(58) Field of Search ............... 123/1 R; 417/63, 417/72; 62/133–323, 231, 84, 228.4

(56) References Cited

U.S. PATENT DOCUMENTS

| 4,375,207 A | * | 3/1983 | Sieber et al. ............... 123/333 |
| 4,940,114 A | * | 7/1990 | Albrecht ...................... 184/63 |
| 5,518,373 A | * | 5/1996 | Takagi et al. ................. 417/45 |

FOREIGN PATENT DOCUMENTS

JP       A-6-42843       2/1994

* cited by examiner

Primary Examiner—William Wayner
(74) Attorney, Agent, or Firm—Harness, Dickey & Pierce, PLC

(57) ABSTRACT

In a vehicle air conditioner, a control unit includes determining means for determining a first start of a compressor for compressing refrigerant in a refrigerant cycle after being mounted on the vehicle, and control means for controlling operation of the compressor so that the compressor is operated for a predetermined time by a rotation speed equal to or lower than a predetermined rotation speed when the determining means determines the first start of the compressor. Accordingly, breaking-in operation of the compressor can be accurately performed for the predetermined time by an automatic control.

8 Claims, 2 Drawing Sheets

VEHICLE AIR CONDITIONER WITH AUTOMATIC BREAKING-IN OPERATION OF COMPRESSOR

CROSS-REFERENCE TO RELATED APPLICATION

This application is related to Japanese Patent Application No. 2001-130127 filed on Apr. 26, 2001, the contents of which are hereby incorporated by reference.

BACKGROUND OF THE INVENTION

1. Field of the Invention

The present invention relates to a vehicle air conditioner which automatically performs a breaking-in operation of a compressor.

2. Description of Related Art

In a conventional vehicle air conditioner, a breaking-in operation of a compressor is manually performed by an operator in a vehicle assemble line after the air conditioner is mounted on the vehicle. Specifically, in the vehicle assemble line, a compressor-operation instruction switch on an air-conditioning operation panel is turned on by the operator during an engine operation, so that the operation of the compressor is started. Further, during a breaking-in period of the compressor, a rotation speed of the vehicle engine is set at a predetermined rotation speed (e.g., equal to or lower than 2000 rpm), and operation of the compressor is continued for a predetermined time (e.g., 2 minutes). However, because the rotation speed of the vehicle engine and a continuation time of the breaking-in operation are set by the operator, the rotation speed of the vehicle engine may become larger than the predetermined speed, or the continuation time of the breaking-in operation may become shorter than the predetermined time.

Lubricating oil in a refrigerant cycle is firstly sealed within the compressor by a regulation amount. When the breaking-in operation of the compressor is actually performed under a regulation condition, the lubricating oil cannot be sufficiently supplied to each necessary part of the compressor, where the lubricating oil is necessary. Accordingly, the compressor may be operated at a high speed before the lubricating oil is supplied to each necessary part of the compressor, or the air conditioner may be operated in an insufficient state of the breaking-in operation of the compressor, thereby reducing the durability of the compressor.

SUMMARY OF THE INVENTION

In view of the foregoing problems, it is an object of the present invention to provide a vehicle air conditioner which can accurately perform breaking-in operation of a compressor under a predetermined condition by an automatic control.

According to the present invention, in air conditioner for a vehicle, a control unit includes determining means for determining a first start of a compressor for compressing refrigerant in a refrigerant cycle after being mounted on the vehicle, and control means for controlling operation of the compressor to be operated for a predetermined time by a rotation speed equal to or lower than a predetermined rotation speed when the determining means determines the first start of the compressor. Accordingly, when the first start of the compressor is determined, the compressor can be automatically operated by the rotation speed equal to or lower than the predetermined rotation speed for the predetermined time. Therefore, the breaking-in operation of the compressor can be accurately performed by an automatic control under a predetermined condition. Thus, it can accurately prevent a reduce of durability of the compressor, due to an insufficient breaking-in operation of the compressor.

Preferably, the compressor is disposed to be driven by an engine of the vehicle, and the determining means determines the first start of the compressor based on information of the first start of the engine and turning-on information of the compressor. Alternatively, the determining means determines the first start of the compressor based on only information of the first start of the engine.

In the present invention, the control means includes a timer that starts a count of a timer time when the operation of the compressor firstly starts. When the rotation speed of the compressor becomes higher than the predetermined rotation speed in the operation of the compressor due to the first start of the compressor, the control means interrupts the operation of the compressor, and the count of the timer time of the timer. Thereafter, when the rotation speed of the compressor becomes equal to or lower than the predetermined rotation speed, the operation of the compressor is restarted, and continuation of the count of the timer time of the timer means is performed. Accordingly, the breaking-in operation of the compressor can be more accurately performed.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
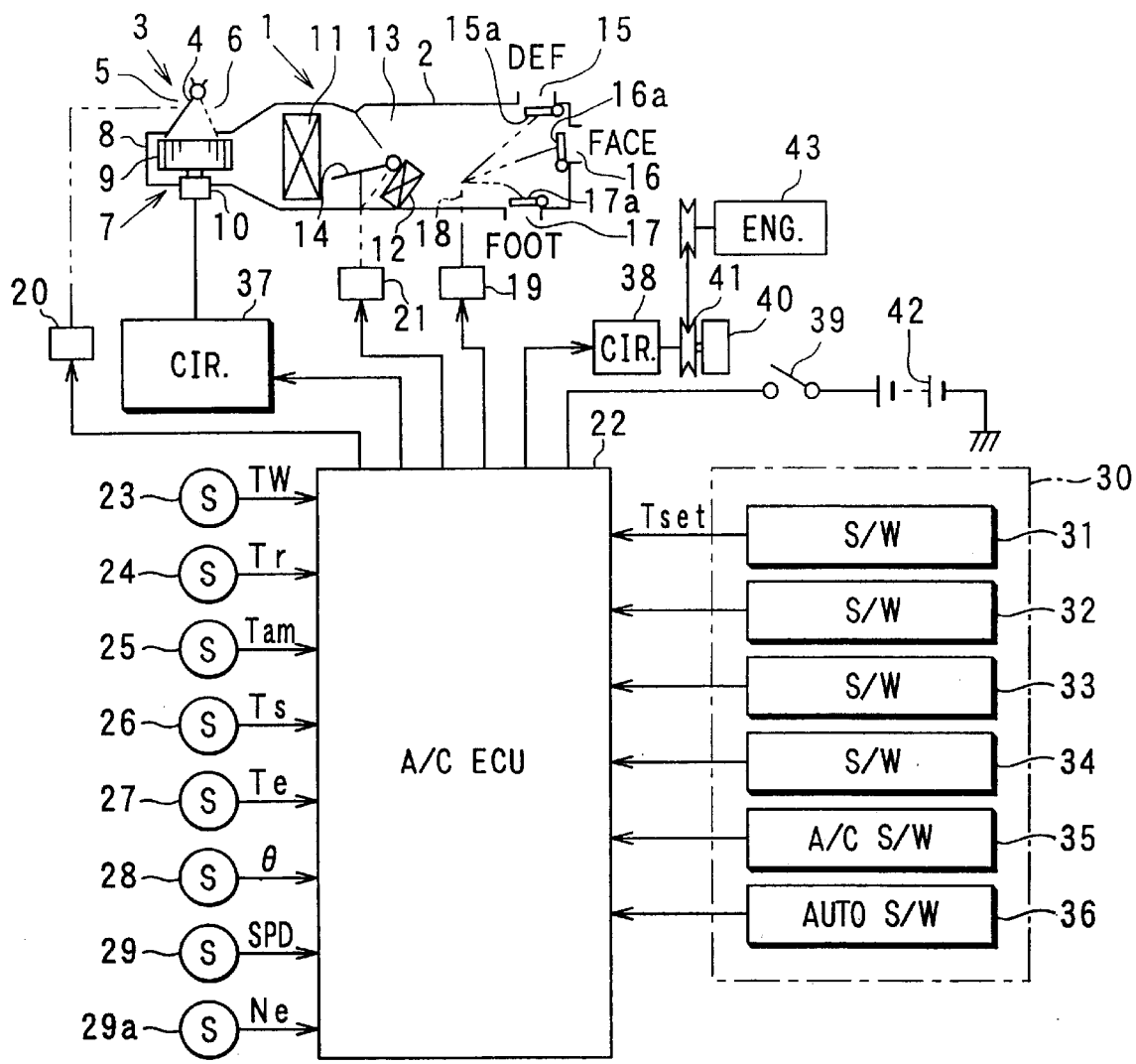
FIG. 1 is a schematic diagram showing a vehicle air conditioner according to a first embodiment of the present invention.

A preferred embodiment of the present invention will be described hereinafter with reference to the accompanying drawings. In this embodiment, an air conditioning case 2 of an air conditioner 1 is disposed inside an instrument panel on a vehicle front side in a passenger compartment. The air conditioning case 2 is formed to define therein an air passage through which air flows into a passenger compartment. An inside/outside air switching box 3 is provided at an upstream air end of the air conditioning case 2. An inside/outside air switching door 4 is disposed in the inside/outside air switching box 3 to open and close an inside air suction port 5 through which inside air inside the passenger compartment is sucked, and an outside air suction port 6 through which outside air outside the passenger compartment is sucked. A blower 7 is disposed at a downstream air side of the inside/outside air switching box 3. The blower 7 includes a case 8 having a suction port from which air introduced from the inside/outside air switching box 3 is introduced, a centrifugal fan 9 disposed in the case 8 for blowing air, and a driving motor 10 for driving and rotating the centrifugal fan 9.

An evaporator 11 used as a cooling heat exchanger is disposed at a downstream air side of the blower 7. The evaporator 11 is provided in a refrigerant cycle having a compressor 40 driven by a vehicle engine 43. Low-pressure refrigerant flowing into the evaporator 11 is evaporated by absorbing heat from air blown by the blower 7, so that air passing through the evaporator 11 is cooled.

The compressor 40 is provided with an electromagnetic clutch 41, so that the power from the vehicle engine 43 is transmitted to the compressor 40 through the electromagnetic clutch 41. A heater core 12 (heating heat exchanger), for heating air using hot water (cooling water) from the vehicle engine 43 as a heating source, is disposed in the air conditioning case 2 at a downstream air side of the evaporator 40. The heater core 12 is disposed in the air conditioning case 2 to form therein a bypass passage 13 through which air from the evaporator 11 bypasses the heater core 12, at one side of the heater core 12.

An air mixing door 14 made of a plate door is rotatably disposed in the air conditioning case 2 between the evaporator 11 and the heater core 12. The air mixing door 14 is disposed to adjust a ratio between an air amount passing through the heater core 12 and an air amount passing through the bypass passage 13, so that the temperature of air blown into the passenger compartment can be adjusted. Accordingly, the air mixing door 14 can be used as a temperature adjustment unit for adjusting the temperature of air blown into the passenger compartment. In this embodiment, warm air from the heater core 12 and cool air from the bypass passage 13 are mixed at a downstream air side of the heater core 13, so that conditioned air having a predetermined temperature can be obtained.

An air-outlet mode switching portion is provided at a downstream end side in the air conditioning case 2. Specifically, a defroster opening 15, a face opening 16 and a foot opening 17 are opened at the downstream end side in the air conditioning case 2. The defroster opening 15 is provided for blowing conditioned air toward an inner surface of a vehicle front windshield through a defroster duct, and is opened and closed by a plate-like defroster door 15a disposed to be rotatable. The face opening 16 is provided for blowing conditioned air toward the upper side of a passenger in the passenger compartment through a face duct, and is opened and closed by a plate-like face door 16a disposed to be rotatable. Further, the foot opening 17 is provided for blowing conditioned air toward the lower side of the passenger in the passenger compartment through a foot duct, and is opened and closed by a plate-like foot door 17a disposed to be rotatable.

The doors 15a, 16a, 17a are connected to a common link mechanism 18, and are driven by an electrical driving unit 19 made of a servomotor through the link mechanism 18. The inside/outside air switching door 4 and the air mixing door 14 are driven by electrical driving units 20, 21 made of servomotors. In this embodiment, by the operation of each door 15a, 16a and 17a, an air outlet mode such as a face mode, a bi-level mode, a foot mode, a foot/defroster mode and a defroster mode can be selected. During the face mode, the face opening 16 is fully opened so that conditioned air is blown toward the upper side of the passenger in the passenger compartment from the face opening 16. During the bi-level mode, both the face opening 16 and the foot opening 17 are opened so that conditioned air is blown toward both upper and lower sides of the passenger in the passenger compartment through the face opening 16 and the foot opening 17. During the foot mode, the foot opening 17 is fully opened and the defroster opening 15 is slightly opened, so that air is mainly blown from the foot opening 17 toward the foot area of the passenger while air is slightly blown toward the inner surface of the front windshield. During the foot/defroster mode, the opening degree of the defroster opening 15 is set approximately to be equal to that of the foot opening 17, so that the air amount blown from the foot opening 17 is decreased and the air amount blown from the defroster opening 15 is increased, as compared with the foot mode. During the defroster mode, the defroster opening 15 is fully opened so that air is blown toward the inner surface of the front windshield from the defroster opening 15.

Next, control operation of an air-conditioning electronic control unit (ECU) 22 will be now described. The electronic control unit 22 is constructed by a microcomputer made of CPU, ROM, RAM and the like, and periphery circuits. The air-conditioning electronic control unit 22 is disposed so that sensor signals from a sensor group and operation signals from operation members are input into the electronic control unit 22 for performing an air-conditioning control of the vehicle air conditioner. The sensor group includes a water temperature sensor 23 for detecting a water temperature TW flowing into the heater core 12, an inside air temperature sensor 24 for detecting an inside air temperature Tr inside the passenger compartment, an outside air temperature sensor 25 for detecting an outside air temperature Tam outside the passenger compartment, a solar radiation sensor 26 for detecting a solar radiation Ts entering into the vehicle, an evaporator temperature sensor 27 for detecting an air temperature Te blown immediately from the evaporator 11, an opening degree detecting sensor 28 for detecting an opening degree θ of the air mixing door 14, a vehicle speed sensor 29 for detecting a vehicle speed SPD, and a rotation speed detection sensor 29a for detecting a rotation speed Ne of the vehicle engine 43.

The operation members are disposed on an air-conditioning operation panel 30 around the instrument panel in the passenger compartment to be manually operated by a passenger in the passenger compartment. The operation members provided in the operation panel 30 includes a temperature setting unit 31 for setting a set temperature Tset desired by the passenger in the passenger compartment, an air amount switch 32 for generating an air amount selecting signal for the blower 7, an inside/outside air selecting switch 33 for generating an inside/outside air selecting signal, an air outlet mode switch 34 for generating an air outlet mode signal, an air-conditioning (A/C) switch 35 for generating on/off signal of the electromagnetic clutch 41, and an automatic switch 36 for automatically setting a control mode. In this embodiment, the air-conditioning switch 35 is an operation command switch for commanding the operation of the compressor 40.

The voltage applied to the driving motor 10 of the blower 7 is controlled by the driving circuit 37 so that the rotation speed of the blower 7 is adjusted. Electrical power supplied to the electromagnetic clutch 41 of the compressor 40 is interrupted by a driving circuit 38. Electrical power from a vehicle battery 42 is supplied to the electronic control unit 22 through an ignition switch 39 of the vehicle engine 43.

Figure 2:
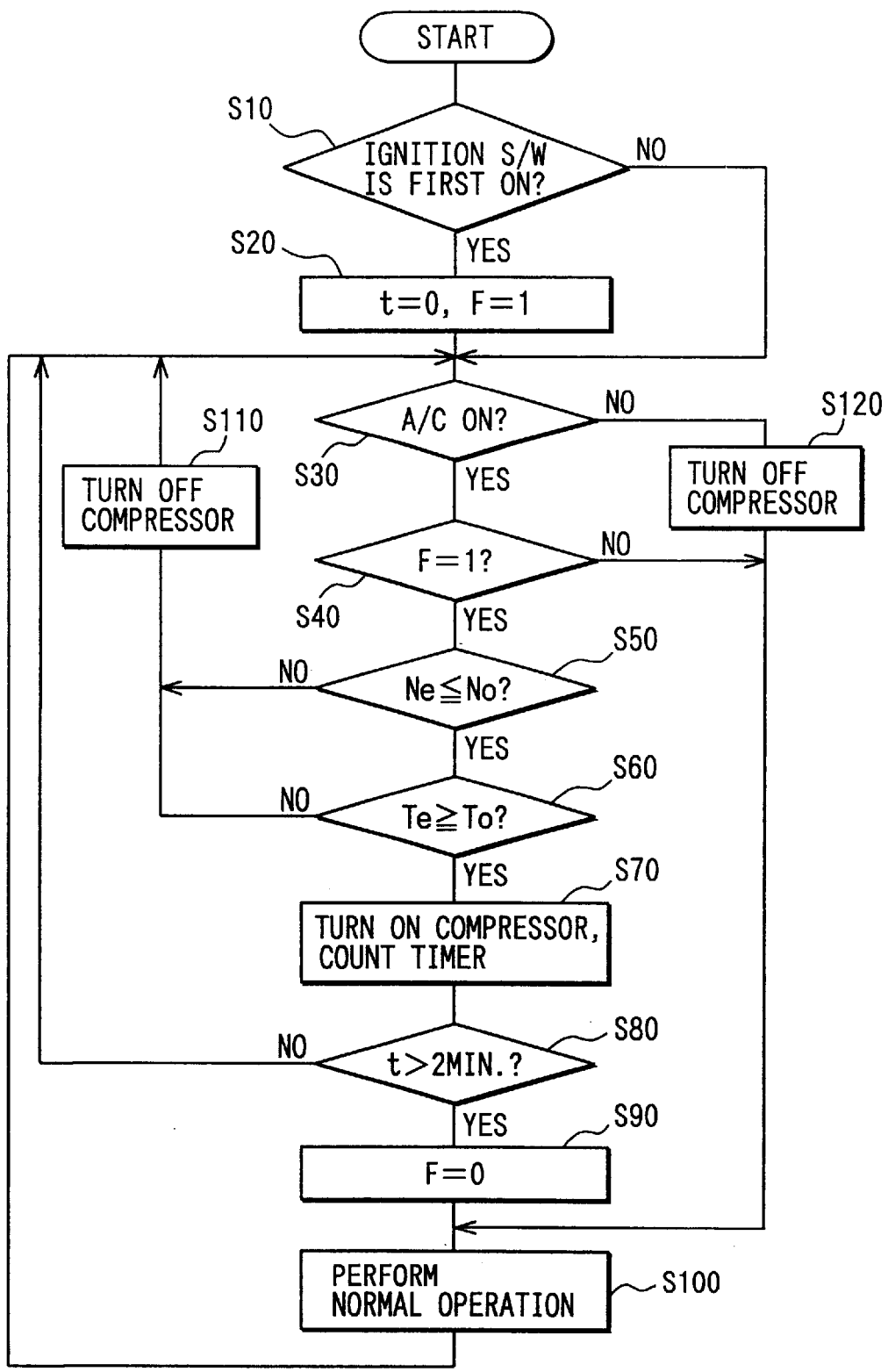
FIG. 2 is a flow diagram showing a control operation of a control unit according to the first embodiment.

Next, control operation of the vehicle air conditioner according to this embodiment will be now described. FIG. 2 shows control processes performed by the microcomputer of the electronic control unit 22. The control routine of FIG. 2 starts when the ignition switch 39 of the vehicle engine 43 is turned on and electrical power is supplied to the control unit 22.

First, at step S10, it is determined whether or not the ignition switch 39 is turned on after a vehicle is assembled.

That is, it is determined whether or not it is a first turning-on state of the ignition switch 39, after the vehicle is assembled to a state capable of running in a vehicle assembly line. For example, a counter for counting the turning-on time number of the ignition switch 39 is provided in the electronic control unit 22, and the counted number is initialized to zero in a factory shipment of the counter, so that the count number of the counter due to a first turning-on time of the ignition switch 39 after the vehicle assembly is 1. Accordingly, when the count number of the counter is 1, it can be determined that the ignition switch 39 is firstly turned on after the vehicle is assembled. When the count number of the counter is equal to or more than 2, it can be determined that the ignition switch 39 is not firstly turned on after the vehicle is assembled.

Figure 3A:
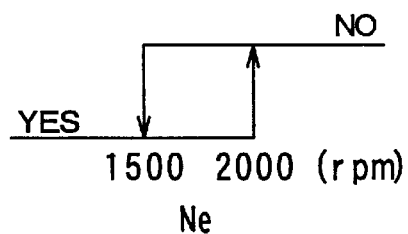
FIGS. 3A and 3B are views for explaining determinations at steps S50 and S60 in FIG. 2.

When the determination at step S10 is YES, a timer is initialized (t=0), and a breaking-in flag F of the compressor 40 is set at 1 (F=1), at step S20. Next, at step S30, it is determined whether or not an air-conditioning switch (A/C switch) 35 is turned on. That is, at step S30, it is determined whether or not the compressor 40 is started. When the air-conditioning switch 35 is not turned on, the compressor 40 is turned off at step S120. When it is determined that the air-conditioning switch 35 is turned on at step S30, it is determined whether or not the breaking-in flag F is 1. When the ignition switch 39 is firstly turned on after the vehicle is assembled, that is, when the air conditioning switch 35 is firstly turned on after the air conditioner is mounted on the vehicle, the breaking-in flag F becomes 1. In this case, it is determined whether or not the engine rotation speed Ne is equal to or lower than a predetermined rotation speed No. Specifically, the determination at step S50 is performed based on the characteristic view in FIG. 3A. As shown in FIG. 3A, a hysteresis width is set for performing the interrupting operation of the compressor 40. For example, when the engine rotation speed Ne is lower than a first predetermined speed (e.g., 1500 rpm), the determination at step S50 is YES. On the other hand, when the engine rotation speed Ne is higher than a second predetermined speed (e.g., 2000 rpm), the determination at step S50 is NO.

Figure 3B:
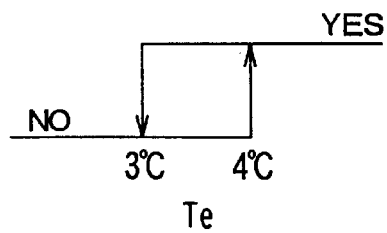

Next, at step S60, it is determined whether or not the air temperature Te immediately blown from the evaporator 20 is equal to or higher than a predetermined temperature To. Specifically, the determination at step S60 is performed based on the characteristic view in FIG. 3B. As shown in FIG. 3B, a hysteresis width is set for performing the interrupting operation of the compressor 40. For example, when the air temperature Te is higher than a first predetermined temperature (e.g., 4° C.), the determination at step S60 is YES. On the other hand, when the air temperature Te is lower than a second predetermined temperature (e.g., 3° C.), the determination at step S60 is NO. When the determination at step S60 is NO, the operation of the compressor 40 is turned off. Because the hysteresis width is set for the determinations at steps S50, S60, the interrupting operation of the compressor 40 can be smoothly controlled without panting.

When the air temperature Te blown from the evaporator 11 is equal to or higher than the predetermined temperature To at step S60, electrical power is supplied to the electromagnetic clutch 41 of the compressor 40, so that the operation of the compressor 40 is started at step S70. Simultaneously, at step S70, the count of a timer starts. The timer is for regulating the breaking-in time of the compressor 40 to a predetermined time. In this embodiment, the time "t" for which the breaking-in operation of the compressor 40 is performed is set at 2 minutes, for example.

When the air temperature Te blown from the evaporator 11 becomes lower than the predetermined temperature To while the count time "t" of the timer does not pass 2 minutes, the operation of the compressor 40 is stopped. When the operation of the compressor 40 is stopped in the breaking-in operation of the compressor 40, the count of the timer is stopped. Thereafter, when the engine rotation speed Ne (i.e., compressor rotation operation) becomes again equal to or lower than the predetermined rotation speed No, or when the air temperature Te blown from the evaporator 11 becomes again equal to or higher than the predetermined temperature To, the operation of the compressor 40 restarts at step S70, and the continuation of the count of the timer is performed. When the timer time t (breaking-in time period) becomes larger than a predetermined time (e.g., 2 minutes), the breaking-in flag F is set at zero (F=0).

Even after the operation of the compressor 40 is interrupted, the breaking-in operation of the compressor 40 can be restarted while the rotation speed of the compressor 40 is restricted to be equal to or lower than the predetermined rotation speed. Therefore, the breaking-in operation of the compressor 40 can be accurately performed for a predetermined time period by an automatic control.

Further, because the count number counting the turning-on time of the ignition switch 39 and the breaking-in flag F are stored in a memory member of the microcomputer, the information storage of the count number of the turning-on time of the ignition switch 39 and the information storage of the breaking-in flag F can be maintained. Accordingly, when the ignition switch 39 is turned on twice or more after the vehicle is assembled, the determination at step S10 is NO, and control program moves to step S30 while bypassing step S20. In this case, it is directly determined whether or not the air conditioning switch 35 is turned on. When the air conditioning switch 35 is turned on at step S30, it is determined whether or not the breaking-in flag F is 1 at step S40.

When the breaking-in operation of the compressor 40 is finished by the firstly turning-on operation of the ignition switch 39 after the vehicle is assembled, the breaking-in flag F becomes zero at step S90. In this case, the determination at step S40 becomes NO, and a normal operation of the compressor 40 can be performed at step S100. When it is determined that the air-conditioning switch 35 is turned off at step S30, the operation of the compressor 40 is not started at step S120.

Although the present invention has been fully described in connection with the preferred embodiment thereof with reference to the accompanying drawings, it is to be noted that various changes and modifications will become apparent to those skilled in the art.

For example, in the above-described embodiment of the present invention, when it is determined that the air-conditioning switch 35 is turned on at step S30, the breaking-in operation of the compressor 40 is automatically controlled. However, the automatic control of the breaking-in operation of the compressor 40 may be operatively linked with the first turning-on operation of the ignition switch 39 after the assembly of the vehicle. For example, the determination at step S30 in FIG. 2 may be omitted. In this case, when it is determined that the ignition switch 39 is firstly turned on, the breaking-in operation of the compressor 40 may be automatically performed.

In the above-described embodiment of the present invention, the driving source of the compressor 40 is the vehicle engine 43. However, the present invention may be applied to a case where the driving source of the compressor 40 is an electrical motor of an electrical vehicle. That is, the control (breaking-in control), for controlling the rotation speed of the compressor 40 to be equal to or lower than the predetermined rotation speed for a predetermined time, may be automatically performed, when a condition under which the operation of the compressor 40 starts is determined, regardless of the driving source of the compressor 40.

In the above-described embodiment of the present invention, at step S50, the rotation speed Ne of the engine 43 is controlled to be lower than a predetermined rotation speed No, in order to control the rotation speed of the compressor 40. Accordingly, the rotation speed of the compressor 40 may be detected instead of the engine rotation speed Ne, and it may be determined whether or not the rotation speed of the compressor 40 is equal to or lower than a predetermined rotation speed at step S50.

Such changes and modifications are to be understood as being within the scope of the present invention as defined by the appended claims.

What is claimed is:

1. An air conditioner for a vehicle, comprising:

determining means for determining a first start of a compressor for compressing refrigerant in a refrigerant cycle, after being mounted on the vehicle; and control means for controlling operation of the compressor to be operated for a predetermined time by a rotation speed equal to or lower than a predetermined rotation speed, when the determining means determines the first start of the compressor.

2. The air conditioner according to claim 1, wherein:

the compressor is disposed to be driven by an engine of the vehicle; and the determining means determines the first start of the compressor based on information of the first start of the engine and turning-on information of the compressor.

3. The air conditioner according to claim 1, wherein:

the compressor is disposed to be driven by an engine of the vehicle; and the determining means determines the first start of the compressor based on only information of the first start of the engine.

4. The air conditioner according to claim 1, wherein:

the control means includes a timer that starts a count of a timer time, when the operation of the compressor firstly starts;

when the rotation speed of the compressor becomes higher than the predetermined rotation speed in the operation of the compressor due to the first start of the compressor, the control means interrupts the operation of the compressor, and the count of the timer time of the timer; and when the rotation speed of the compressor becomes equal to or lower than the predetermined rotation speed, the operation of the compressor is restarted, and continuation of the count of the timer time of the timer means is performed.

5. The air conditioner according to claim 1, further comprising memory means for storing each operation time for which the compressor is operated by the rotation speed equal to or lower than the predetermined rotation speed of the compressor, wherein the memory means holes a memory state even when electrical power supplied to the compressor is stopped.

6. The air conditioner according to claim 1, wherein the control means automatically controls breaking-in operation of the compressor based on signal from the determining means.

7. A control method for automatically performing breaking-in operation of a compressor after being mounted on a vehicle, the control method comprising determining a first-time start of the compressor after being mounted on the vehicle; and controlling the breaking-in operation of the compressor at a rotation speed equal to or lower than a predetermined rotation speed for a predetermined time when the first-time start of the compressor after being mounted on the vehicle is determined.

8. the control method according to claim 7, wherein:

the controlling includes counting of a timer time, when the operation of the compressor firstly starts;

when the rotation speed of the compressor becomes higher than the predetermined rotation speed in the operation of the compressor due to the first start, the operation of the compressor and the count of the timer time of the timer are interrupted; and when the rotation speed of the compressor becomes equal to or lower than the predetermined rotation speed, the operation of the compressor is restarted, and continuation of the count of the timer time is performed, so that the compressor is operated for the predetermined time while the rotation speed of the compressor is restricted to be equal to or lower than the predetermined rotation speed.

* * * * *